Dec. 19, 1922.

J. O. TURNER.
OIL BURNER.
FILED MAR. 9, 1922.

Witnesses:—
Lawrence Schlosser
William Thickstun

Inventor
J. O. Turner,
By Clarence A. O'Brien
Attorney

Dec. 19, 1922.

J. O. TURNER.
OIL BURNER.
FILED MAR. 9, 1922.

Witnesses
Lawrence Schlosser
William Thickstun

Inventor
J. O. Turner,
By Clarence A. O'Brien
Attorney

Patented Dec. 19, 1922.

1,439,041

UNITED STATES PATENT OFFICE.

JOSEPH O. TURNER, OF FRANKLIN, KENTUCKY.

OIL BURNER.

Application filed March 9, 1922. Serial No. 542,262.

*To all whom it may concern:*

Be it known that I, JOSEPH O. TURNER, a citizen of the United States, residing at Franklin, in the county of Simpson and State of Kentucky, have invented new and useful Improvements in Oil Burners, of which the following is a specification.

My present invention has to do with hydrocarbon burners for use in heating and cooking stoves and furnaces and its object is to provide an extremely simple and inexpensive burner which is strong and durable and efficient and economical in operation.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
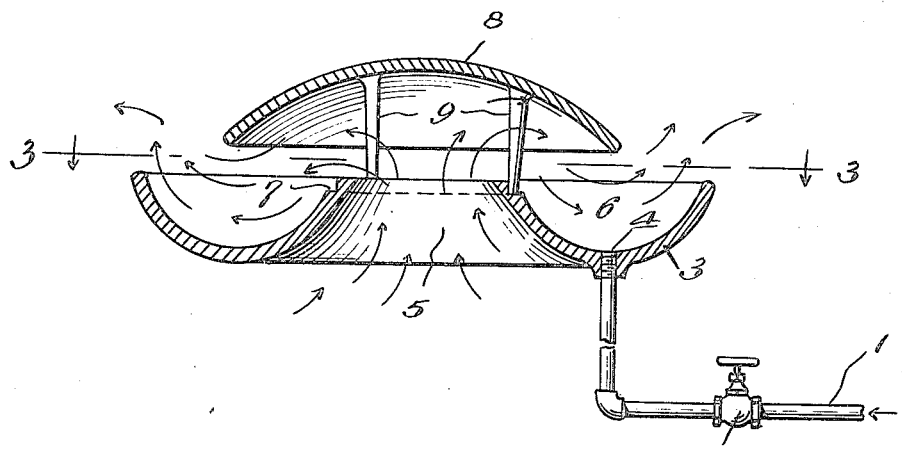
Figure 1 is a vertical section showing by way of example the form of burner for use in a cylindrical heating stove.
Figure 2:
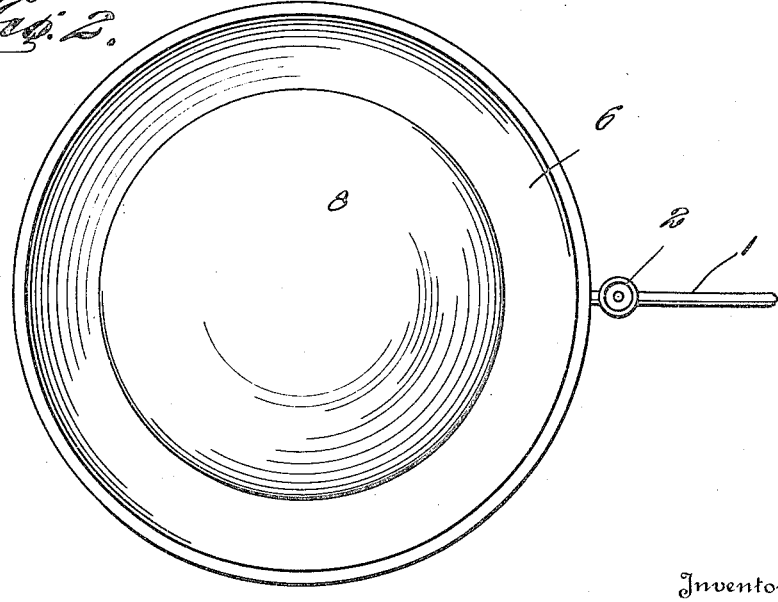
Figure 2 is a top plan view of the same.
Figure 3:
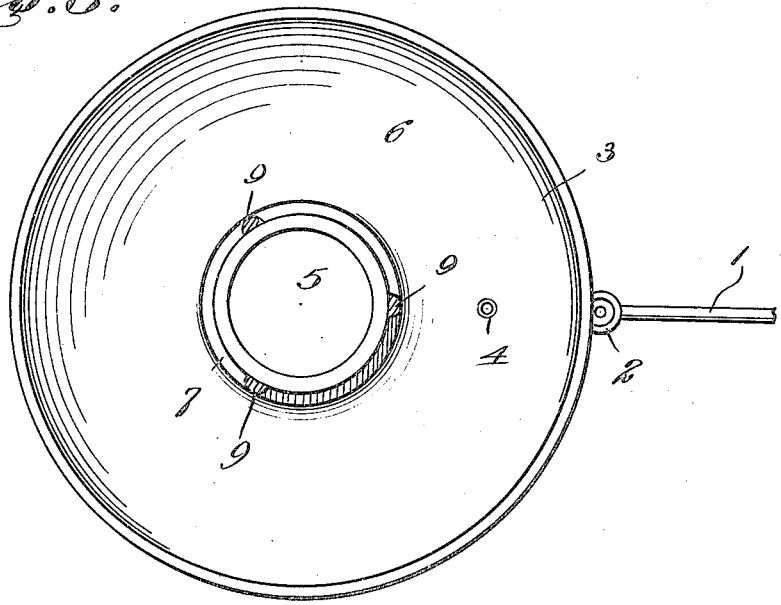
Figure 3 is a horizontal section taken in the plane indicated by the line 3—3 of Figure 1, looking downwardly.
Figure 4:
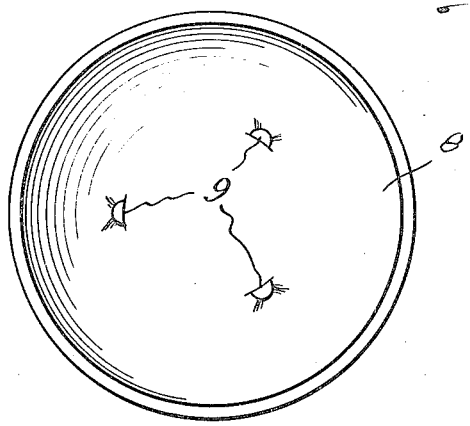
Figure 4 is an inverted plan view of the deflecting member of the burner.

Various kinds of hydrocarbon may be burnt to advantage in my novel burner, the hydrocarbon being conducted from an appropriate source of supply (not shown) through a pipe 1, equipped with a valve 2 to the bottom of the hydrocarbon or oil pan 3 of the burner, as designated by 4 in Figures 1 and 3. The said pan 3 is provided with a central upwardly-tapered opening 5 for the passage of air, and about the said opening 5 is arranged the oil-holding portion 6 of the pan which portion 6 is of concavo-convex form in vertical cross-section as illustrated. At 7 the inner wall of the pan 3 is rabbeted to afford a ledge adjacent to the pan portion 6.

The pan 3, for the sake of cheapness, is preferably formed of cast iron as is also the deflecting member 8 of the burner. The said deflecting member 8 is of concavo-convex form in vertical cross-section with its concave side lowermost—i. e., reversed as compared with the pan portion 6 in which the concave side is uppermost. Integral with the member 8 are legs 9 which are grouped about the center of the member 8 and merely bear at the lower ends on the before mentioned ledge afforded by the rabbet 7. From this it follows that by merely lifting the member 8 it can be disassociated from the pan 3; also, that the bearing of the inner sides of the legs 9 against the vertical wall of the said rabbet 7 may be depended on to preclude casual lateral shifting or displacement of the member 8.

The member 8 is of a proportional size to overhang a considerable portion of the oil-holding part 6 of the pan 3, and hence when oil is supplied to the said part 6 and is ignited, the draft of air passing upwardly through the opening 5 and striking the concave underside of the member 8 will be directed downwardly and outwardly against and pass the burning oil in the pan part 6 and radially outward to highly heat the wall of a stove as is desirable.

As hereinbefore indicated the annular type or round type of burner shown and described is designed for cylindrical heating stoves, but I would have it understood that it is within the purview of my invention to make the burner of oblong configuration in plan to suit the burner to a cook stove or to a furnace when the shape of the latter requires an oblong burner.

Manifestly the heat afforded by my novel burner may be regulated by manipulation of the valve 2 which will, by preference, be arranged exteriorly of the stove or furnace in which the burner is located.

Having described my invention, what I claim and desire to secure by Letters-Patent, is:—

In a hydrocarbon burner, a pan having a central upwardly-tapered opening extending throughout the height thereof and also having an oil-holding portion about said opening, said oil-holding portion of concavo-convex form in cross-section with its concave side uppermost, and the wall between the central opening and the oil-holding portion being rabbeted at its side toward the latter, a concavo-convex deflector member of larger size than the central portion of the pan spaced above the pan, with its concave side lowermost and overhanging the oil-holding portion of the pan, legs integral with the deflector member and grouped about the center of the burner and bearing on the ledge afforded by said rabbet and against the upright wall thereof, and a valved oil supply pipe leading upwardy into the bottom of the oil-holding portion of the pan.

In testimony whereof, I affix my signature.

JOSEPH O. TURNER.